(12) United States Patent
Stocco et al.

(10) Patent No.: US 11,387,752 B2
(45) Date of Patent: Jul. 12, 2022

(54) WASHING MACHINE FOR WASHING ARTICLES EQUIPPED WITH AN ELECTRIC DRIVE UNIT TO OPERATE ELECTRIC MOTORS

(71) Applicant: Electrolux Appliances Aktiebolag, Stockholm (SE)

(72) Inventors: Piero Stocco, Porcia (IT); Alberto Bisutti, Porcia (IT)

(73) Assignee: Electrolux Appliances Aktiebolag

( * ) Notice: Subject to any disclaimer, the term of this patent is extended or adjusted under 35 U.S.C. 154(b) by 313 days.

(21) Appl. No.: 16/641,852

(22) PCT Filed: Sep. 1, 2017

(86) PCT No.: PCT/EP2017/072017
§ 371 (c)(1),
(2) Date: Feb. 25, 2020

(87) PCT Pub. No.: WO2019/042568
PCT Pub. Date: Mar. 7, 2019

(65) Prior Publication Data
US 2021/0159819 A1    May 27, 2021

(51) Int. Cl.
*H02P 5/68*        (2006.01)
*H02P 7/29*        (2016.01)
(Continued)

(52) U.S. Cl.
CPC ............ *H02P 5/68* (2013.01); *A47L 15/4225* (2013.01); *A47L 15/46* (2013.01); *D06F 34/08* (2020.02);
(Continued)

(58) Field of Classification Search
CPC ...... H02P 5/68; H02P 7/04; H02P 7/29; D06F 34/08; D06F 37/304; D06F 34/10; A47L 15/4225; A47L 15/46
See application file for complete search history.

(56) References Cited

U.S. PATENT DOCUMENTS 5,038,091 A * 8/1991 Bashark ................ B30B 9/3064
318/809
5,130,624 A * 7/1992 Bashark .................. D06F 33/34
318/284

(Continued)

FOREIGN PATENT DOCUMENTS

EP    1269622 B1    7/2005
EP    3249089 A1 * 11/2017    ........... D06F 37/304
GB    2360885 A  * 10/2001    ........... D06F 37/304

OTHER PUBLICATIONS

International Search Report and Written Opinion for International Application No. PCT/EP2017/072017, dated May 22, 2018, 8 pages.

*Primary Examiner* — Thai T Dinh
(74) *Attorney, Agent, or Firm* — RatnerPrestia

(57) ABSTRACT

A washing machine having a first single phase electric motor, a second single phase electric motor and an electric drive unit for the electric motors. The electric drive unit is connected to power supply lines and comprises three first legs, each leg comprising a pair of switches. Electrical terminals of the first electric motor are connected to the first and second legs of the electric drive unit and electrical terminals of the second electric motor are connected to the second and third legs of the electric drive unit.

16 Claims, 6 Drawing Sheets

(51) Int. Cl.
*D06F 34/10* (2020.01)
*D06F 34/08* (2020.01)
*A47L 15/46* (2006.01)
*H02P 7/03* (2016.01)
*A47L 15/42* (2006.01)
*D06F 37/30* (2020.01)
*D06F 105/08* (2020.01)
*D06F 23/02* (2006.01)
*D06F 103/46* (2020.01)

(52) U.S. Cl.
CPC ............ *D06F 34/10* (2020.02); *D06F 37/304* (2013.01); *H02P 7/04* (2016.02); *H02P 7/29* (2013.01); *A47L 2501/05* (2013.01); *D06F 23/02* (2013.01); *D06F 2103/46* (2020.02); *D06F 2105/08* (2020.02)

(56) References Cited

U.S. PATENT DOCUMENTS

| | | | | |
|---|---|---|---|---|
| 5,237,256 A | * | 8/1993 | Bashark | .................. H02P 25/04 |
| | | | | 318/751 |
| 2015/0236625 A1 | * | 8/2015 | Cho | ....................... H02K 11/33 |
| | | | | 318/400.15 |

* cited by examiner

WASHING MACHINE FOR WASHING ARTICLES EQUIPPED WITH AN ELECTRIC DRIVE UNIT TO OPERATE ELECTRIC MOTORS

This application is a U.S. National Phase application of PCT International Application No. PCT/EP2017/072017, filed Sep. 1, 2017, which is incorporated by reference herein.

FIELD OF THE INVENTION

The present invention relates to washing machines for washing articles, and is directed in particular to laundry washing machines, laundry washing-drying machines and dishwashers.

BACKGROUND ART

In a washing machine, in particular laundry washing machines or dishwashers, a plurality of electric motors are commonly used.

Electric motors are typically used in hydraulic pumps which equips such machines.

For example, in laundry washing machines or in laundry washing-drying machines, but also in dishwashers, one or more drain pumps for pumping out the water and one or more circulating pumps for use during the washing process may be provided.

The electric motors used in said pumps are generally supplied with system voltage from the domestic (mains) system.

In a first type of known systems, electric motors are operated directly from the single-phase domestic mains, without expensive rectifier control systems. The motor speed is typically constant and the pump is opportunely activated by turning on and off the motor when necessary.

In order to be able to adjust the speed of the motor, it is usual to employ an electric drive unit. An electric drive unit of known type comprises a full bridge inverter circuit, or H-bridge circuit, having four switches arranged in bridge form with the motor at the center.

A control unit opportunely connected to the motor drives the switches to control the motor speed.

Each of the motors which equips the treating machine therefore requires a full bridge inverter circuit and a respective control unit, or in case a common control unit for the various full bridge inverter circuits.

A drawback of the known techniques is therefore the complexity of the electric drive unit for the electric motors used in the washing machine.

These negatively affect manufacturing costs and reliability of the washing machine.

The main object of the present invention is therefore to overcome said drawbacks.

It is an object of the invention to provide a washing machine with an electric drive unit for electric motors with reduced complexity compared to known techniques.

It is another object of the invention to provide a washing machine with an electric drive unit for electric motors with reduced costs compared to known techniques.

It is a further object of the invention to provide a washing machine with an electric drive unit for electric motors having higher reliability compared to known techniques.

It is another object of the invention to provide a washing machine with a single electric drive unit suitable to drive two electric motors.

DISCLOSURE OF INVENTION

Applicant has found that by providing a washing machine having a first single phase electric motor, a second single phase electric motor and an electric drive unit for said electric motors, said electric drive unit being connected to a first power supply line and a second power supply line, wherein said electric drive unit comprises a first leg comprising two switches connected in series, a second leg comprising two switches connected in series and a third leg comprising two switches connected in series and by connecting said first electric motor to said first leg and said second leg and by connecting said second electric motor to said second leg and said third leg, it is possible to reach the mentioned objects.

In a first aspect thereof, the present invention relates, therefore, to a washing machine having a first single phase electric motor, a second single phase electric motor and an electric drive unit for said electric motors, said electric drive unit being connected to a first power supply line and a second power supply line, wherein said electric drive unit comprises:

a first leg comprising a first switch and a second switch connected in series between said first power supply line and said second power supply line;

a second leg comprising a third switch and a fourth switch connected in series between said first power supply line and said second power supply line;

a third leg comprising a fifth switch and a sixth switch connected in series between said first power supply line and said second power supply line;

wherein a first electrical terminal of said first electric motor is connected to said first leg and a second electrical terminal of said first electric motor is connected to said second leg and wherein a first electrical terminal of said second electric motor is connected to said second leg and a second electrical terminal of said second electric motor is connected to said third leg.

Preferably, the first electrical terminal of the first electric motor is connected to a node between the first switch and the second switch of the first leg and the second electrical terminal of the first electric motor is connected to a node between the third switch and the fourth switch of the second leg and wherein the first electrical terminal of the second electric motor is connected to a node between the third switch and the fourth switch of the second leg and the second electrical terminal of the second electric motor is connected to a node between the fifth switch and the sixth switch of the third leg.

In a preferred embodiment of the invention, switches comprise solid-state switches, preferably MOSFETs or IGBTs.

According to a preferred embodiment of the invention, one or more of the switches comprises a free-wheel diode.

Preferably, the first leg comprises a first resistor, wherein the first resistor is preferably connected between the second switch and the second power supply line.

Preferably, the second leg comprises a second resistor, wherein the second resistor is connected between the fourth switch and the second power supply line.

Preferably, the third leg comprises a third resistor, wherein the third resistor is connected between the sixth switch and the second power supply line.

According to a preferred embodiment of the invention, the machine comprises a control unit for turning on and off each one of said switches.

In a preferred embodiment of the invention, the control unit controls said first to fourth switches to activate the first electric motor and preferably controls said first to fourth switches according to a PWM technique.

In a preferred embodiment of the invention, the control unit controls said third to sixth switches to activate the second electric motor and preferably controls said third to sixth switches according to a PWM technique.

According to a preferred embodiment of the invention, the first electric motor or the second electric motor is a synchronous electric motor.

Preferably, the first electric motor or the second electric motor is an electric motor of a pump which equips said washing machine.

In a preferred embodiment of the invention, the first power supply line and the second power supply line are connectable to a AC voltage system.

Preferably, the machine further comprises a rectifier unit and a DC voltage intermediate circuit between the AC voltage system and the first power supply line and the second power supply line.

In a further aspect thereof, the invention relates to a method for activating a first single phase electric motor or a second single phase electric motor in a washing machine by means of an electric drive unit comprising:

a first leg comprising a first switch and a second switch connected in series between said first power supply line and said second power supply line;

a second leg comprising a third switch and a fourth switch connected in series between said first power supply line and said second power supply line;

a third leg comprising a fifth switch and a sixth switch connected in series between said first power supply line and said second power supply line;

wherein a first electrical terminal of said first electric motor is connected to said first leg and a second electrical terminal of said first electric motor is connected to said second leg and wherein a first electrical terminal of said second electric motor is connected to said second leg and a second electrical terminal of said second electric motor is connected to said third leg;

said method comprising the step of activating said first single phase electric motor by controlling said first to fourth switches or the step of activating said second single phase electric motor by controlling said third to sixth switches.

In another aspect thereof, the invention relates to a method for activating a first single phase electric motor or a second single phase electric motor in a washing machine by means of an electric drive unit comprising:

a first leg comprising a first switch and a second switch connected in series between said first power supply line and said second power supply line;

a second leg comprising a third switch and a fourth switch connected in series between said first power supply line and said second power supply line;

a third leg comprising a fifth switch and a sixth switch connected in series between said first power supply line and said second power supply line;

wherein a first electrical terminal of said first electric motor is connected to a node between said first switch and said second switch of said first leg and a second electrical terminal of said first electric motor is connected to a node between said third switch and said fourth switch of said second leg and wherein a first electrical terminal of said second electric motor is connected to a node between said third switch and said fourth switch of said second leg and a second electrical terminal of said second electric motor is connected to a node between said fifth switch and said sixth switch of said third leg;

said method comprising the step of activating said first single phase electric motor by controlling said first to fourth switches or the step of activating said second single phase electric motor by controlling said third to sixth switches.

In a preferred embodiment of the invention, the step of controlling said first to fourth switches comprises a PWM technique and/or the step of controlling said third to sixth switches comprises a PWM technique.

BRIEF DESCRIPTION OF THE DRAWINGS

Further characteristics and advantages of the present invention will be highlighted in greater detail in the following detailed description of preferred embodiments of the invention, provided with reference to the enclosed drawings. In the drawings, corresponding characteristics and/or components are identified by the same reference numbers. In such drawings.

DETAILED DESCRIPTION OF EXEMPLARY EMBODIMENTS OF THE INVENTION

The present invention has proved to be particularly advantageous when applied to laundry washing machines, as described below. It should in any case be underlined that the present invention is not limited to this type of application. On the contrary, the present invention can be conveniently applied to other types of washing machines, like for example laundry washing-drying machines or dishwashers, equipped with two or more pumps.

Figure 1:
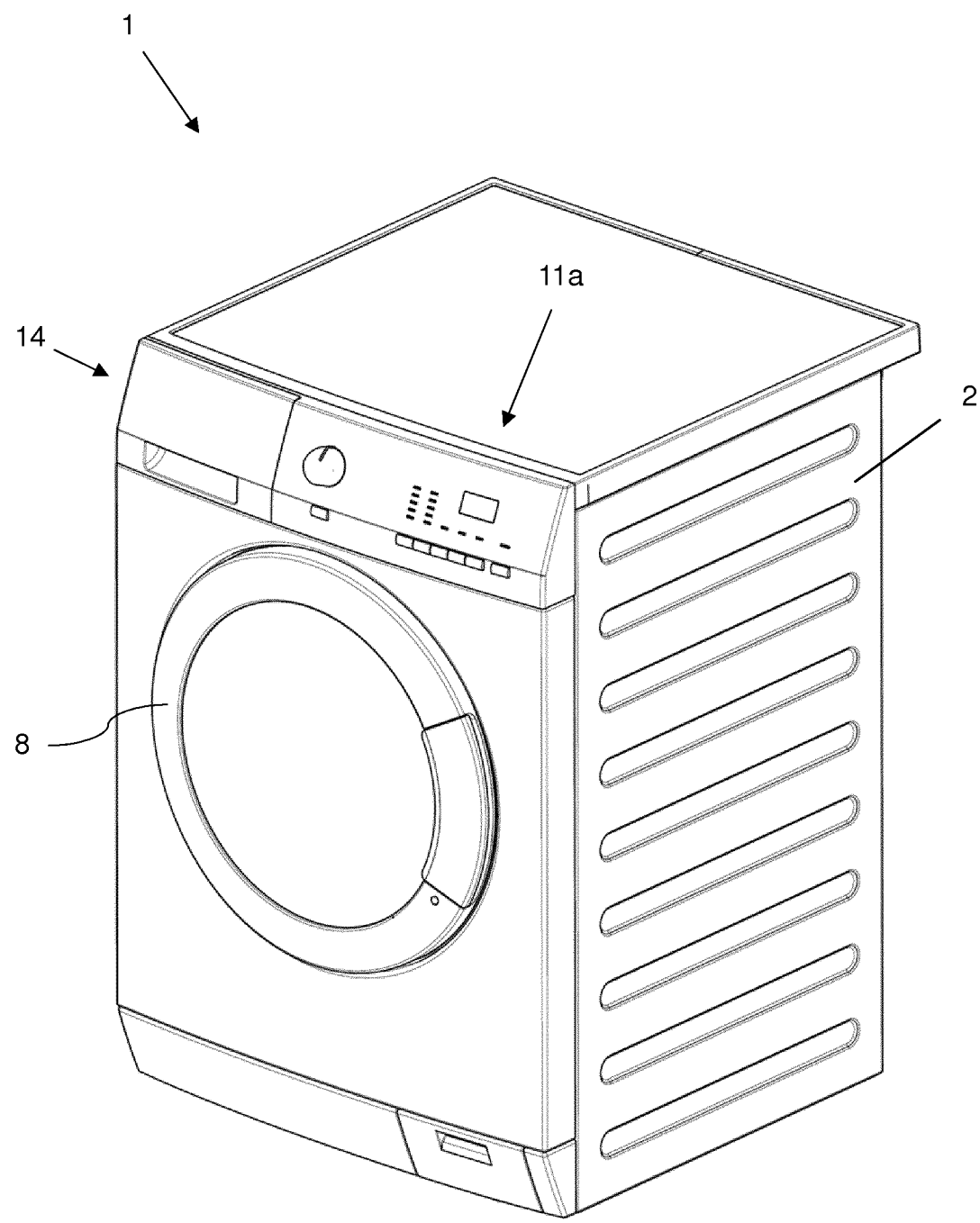
FIG. 1 shows a perspective view of a washing machine according to a first embodiment of the invention.
Figure 2:
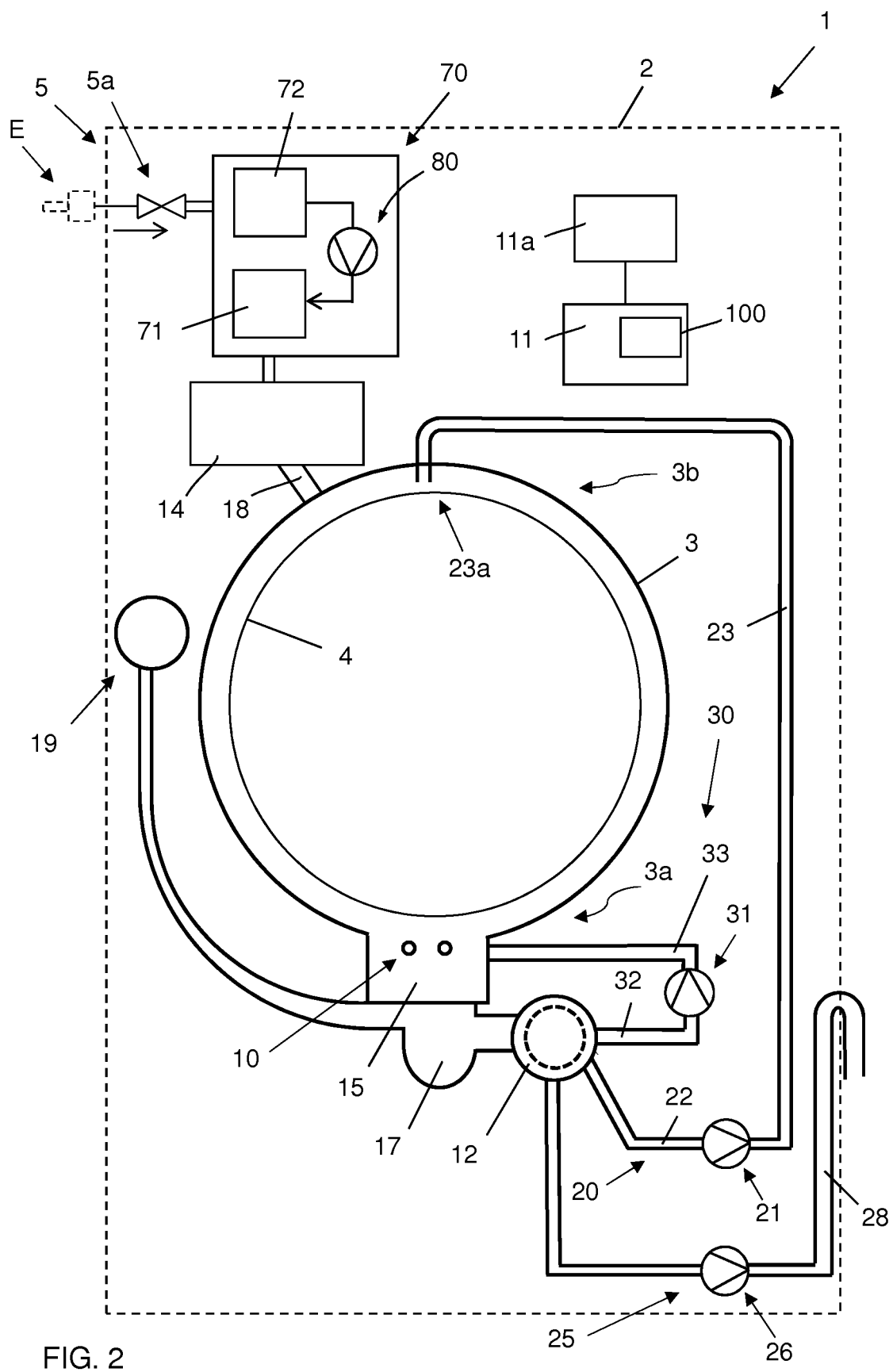
FIG. 2 shows a schematic view of the washing machine of FIG. 1.

With reference to FIGS. 1 and 2, a preferred embodiment of a laundry washing machine 1 according to the invention is described.

The laundry washing machine 1 preferably comprises an external casing or housing 2, a washing tub 3, a container 4, preferably a perforated washing drum 4, where the laundry to be treated can be loaded.

The tub 3 and the drum 4 both preferably have a substantially cylindrical shape.

The housing 2 is provided with a loading/unloading door 8 which allows access to the drum 4.

The drum 4 is advantageously rotated by an electric motor, not illustrated, which preferably transmits the rotating motion to the shaft of the drum 4, advantageously by means of a belt/pulley system. In a different embodiment of the invention, the motor can be directly associated with the shaft of the drum 4.

The drum 4 is advantageously provided with holes which allow the liquid flowing therethrough. Said holes are typically and preferably homogeneously distributed on the cylindrical side wall of the drum 4.

The bottom region 3a of the tub 3 preferably comprises a seat 15, or sump, suitable for receiving a heating device 10. The heating device 10, when activated, heats the liquid inside the sump 15.

In different embodiments, nevertheless, the bottom region of the tub may be configured differently. For example, the bottom region of the tub may not comprise a seat for the heating device. The heating device may be advantageously placed in the annular gap between the tub and the drum.

A water supply circuit 5 is preferably arranged in the upper part of the laundry washing machine 1 and is suited to supply water into the tub 3 from an external water supply line E. The water supply circuit of a laundry washing machine is well known in the art, and therefore it will not be described in detail. The water supply circuit 5 preferably comprises a controlled supply valve 5a which is properly controlled, opened and closed, during the washing cycle.

The laundry washing machine 1 advantageously comprises a treating agents dispenser 14 to supply treating agents into the tub 3 during a washing cycle. Treating agents may comprise, for example, detergents, rinse additives, fabric softeners or fabric conditioners, waterproofing agents, fabric enhancers, rinse sanitization additives, chlorine-based additives, etc.

Preferably, the treating agents dispenser 14 comprises a removable drawer, as visible in FIG. 1, provided with various compartments suited to be filled with treating agents.

In a preferred embodiment, not illustrated, the treating agents dispenser may comprise a pump suitable to convey one or more of said agents from the dispenser to the tub.

In the preferred embodiment here illustrated, the water is supplied into the tub 3 from the water supply circuit 5 by making it flow through the treating agents dispenser 14 and then through a supply pipe 18.

Furthermore, in the preferred embodiment here illustrated, a water softening device 70 is preferably arranged/interposed between the external water supply line E and the treating agents dispenser 14 so as to be crossed by the fresh water flowing from the external water supply line E. The water softening device 70, as known, is structured for reducing the hardness degree of the fresh water drawn from the external water supply line E and conveyed to the treating agents dispenser 14.

In a different embodiment, the water softening device 70 may be arranged/interposed between the external water supply line E and the washing tub 3, so as to be crossed by the fresh water flowing from the external water supply line E and conveying it directly to the washing tub 3.

Some elements and/or components of the water softening device 70 are well known in the art, and therefore will not be described in detail.

The water softening device 70 basically comprises a water-softening agent container 71 and a regeneration-agent reservoir 72.

The water-softening agent container 71 is crossed by the fresh water arriving from the external water supply line E. The water-softening agent container 71 is filled with a water softening agent able to reduce the hardness degree of the fresh water flowing through the same water-softening agent container 71.

The regeneration-agent reservoir 72 is fluidly connected to the water-softening agent container 71 and is structured for receiving a given quantity of salt or other regeneration agent. The regeneration agent (salt) mixed with water create a mixture, or brine, which is able to regenerate the water softening function of the water softening agent stored inside the water-softening agent container 71.

The water softening device 70 then preferably comprises an electrically-powered brine-circulating pump 80 which is interposed between the water-softening agent container 71 and the regeneration-agent reservoir 72 and is structured for transferring/moving, when activated, the brine (for example salt water) from the regeneration-agent reservoir 72 to the water-softening agent container 71.

Laundry washing machine 1 preferably comprises a water outlet circuit 25 suitable for withdrawing liquid from the bottom region 3a of the tub 3.

The water outlet circuit 25 preferably comprises a main pipe 17, a draining pump 26 and an outlet pipe 28 ending outside the housing 2.

The water outlet circuit 25 preferably further comprises a filtering device 12 arranged between the main pipe 17 and the draining pump 26. The filtering device 12 is adapted to retain all the undesirable bodies (for example buttons that have come off the laundry, coins erroneously introduced into the laundry washing machine, etc.).

The main pipe 17 connects the bottom region 3a of the tub 3 to the filtering device 12.

In a further embodiment, not illustrated, the filtering device 12 may be provided directly in the tub 3, preferably obtained in a single piece construction with the latter. In this case, the filtering device 12 is fluidly connected to the outlet of the tub 3, in such a way that water and washing liquid drained from the tub 3 enters the filtering device 12.

Activation of the drain pump 26 drains the liquid, i.e. dirty water or water mixed with washing and/or rinsing products, from the tub 3 to the outside.

Laundry washing machine 1 preferably comprises a first recirculation circuit 30, or mixing circuit 30. The mixing circuit 30 is adapted to drain liquid from the bottom region 3a of the tub 3 and to re-admit such a liquid (recirculated mixing liquid) into a first region of the tub 3, which substantially corresponds to the same bottom region 3a of the tub 3.

Preferably, the mixing circuit 30 is adapted to drain liquid from the bottom of the sump 15 and to re-admit such a liquid (recirculated mixing liquid) again into the sump 15.

The mixing circuit 30 preferably comprises a first recirculation pump 31, a first pipe 32 connecting the filtering device 12 to the first recirculation pump 31 and a second recirculation pipe 33, preferably ending inside the sump 15, as mentioned above.

In a further preferred embodiment, not illustrated, the mixing circuit may comprise a dedicated pipe connecting the bottom region of the tub to the recirculation pump; in this case, the mixing circuit is advantageously completely separated from the water outlet circuit, i.e. completely separated from the filtering device 12 and the main pipe 17.

The mixing circuit is preferably realized for transferring a portion of a liquid from a bottom region of the tub to the same bottom region for mixing and/or dissolution of the products, in particular of the detergent.

Laundry washing machine 1 preferably comprises a second recirculation circuit 20 adapted to drain liquid from the bottom region 3a of the tub 3 and to re-admit such a liquid into a second region 3b, or upper region, of the tub 3.

The second recirculation circuit 20 preferably comprises a second recirculation pump 21, a second pipe 22 connecting the filtering device 12 to the second recirculation pump 21 and a second recirculation pipe 23, preferably provided with a terminal nozzle 23a arranged preferably at the upper region 3b of the tub 3. In a preferred embodiment, the terminal nozzle 23a is opportunely arranged so that the liquid is sprayed into the drum 4 through its holes.

In further preferred embodiments, the terminal nozzle is arranged at the bellows of the door 8.

The terminal nozzle 23a, therefore, enhances distribution of liquid over the laundry through the perforated drum 4.

The liquid from the bottom region 3a of the tub 3 is conveyed towards the upper region 3b of the tub 3 by activation of the second recirculation pump 21.

The second recirculation circuit 20 is therefore advantageously activated in order to improve wetting of the laundry inside the drum 4.

In general, the second recirculation circuit is properly realized for transferring a portion of a liquid from a bottom region of the tub, preferably from the sump, to an upper region of the tub in order to enhance absorption of the liquid by the laundry.

Preferably, laundry washing machine 1 comprises a device 19 suited to sense (or detect) the liquid level inside the tub 3.

The sensor device 19 preferably comprises a pressure sensor which senses the pressure in the tub 3. From the values sensed by the sensor device 19 it is possible to determine the liquid level of the liquid inside the tub 3. In another embodiment, not illustrated, laundry washing machine may preferably comprise (in addition to or as a replacement of the pressure sensor) a level sensor (for example mechanical, electro-mechanical, optical, etc.) adapted to sense (or detect) the liquid level inside the tub 3.

Laundry washing machine 1 advantageously comprises a control unit 11 connected to the various parts of the laundry washing machine 1 in order to ensure its operation. The control unit 11 is preferably connected to the water inlet circuit 5, the water outlet circuit 25, the recirculation circuits 30, 20, the heating device 10 and the electric motor moving the drum 4 and receives information from the various sensors provided on the laundry washing machine 1, like the pressure sensor 19, a temperature sensor, etc.

In particular, the control unit 11 is preferably connected to the pumps 21, 26, 31, 80 so as to opportunely drive them during the washing cycle.

Laundry washing machine 1 advantageously comprises an interface unit 11a, connected to control unit 11, accessible to the user and by means of which the user may select and set the washing parameters, like for example a desired washing cycle. Usually, other parameters can optionally be inserted by the user, for example the washing temperature, the spinning speed, the load in terms of weight of the laundry to be washed, etc.

Based on the parameters acquired by said interface 11a, the control unit 11 sets and controls the various parts of the laundry washing machine 1 in order to carry out the desired washing cycle.

As illustrated above, the laundry washing machine 1 is equipped with a plurality of pumps 21, 26, 31, 80.

Figure 3:
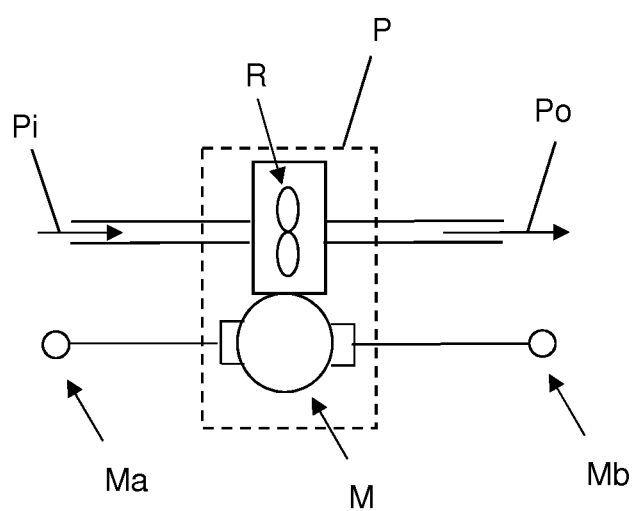
FIG. 3 shows some elements of the washing machine according to an embodiment of the present invention.

One of said pumps 21, 26, 31, 80 is schematically illustrated in FIG. 3 and indicated with reference P. The pump P preferably comprises an inlet Pi, a rotating element R, or impeller, and an outlet Po.

Rotating element R increases the pressure and flow of the liquid from the inlet Pi towards the outlet Po.

Pumps used in laundry treating machines are well known in the art, and therefore will not be described in detail.

The pump P preferably comprises a single phase electric motor M, preferably a synchronous electric motor, adapted to be powered/fed between its electrical terminals Ma and Mb for causing impeller rotation and hence activation of the pump P.

Figure 4:
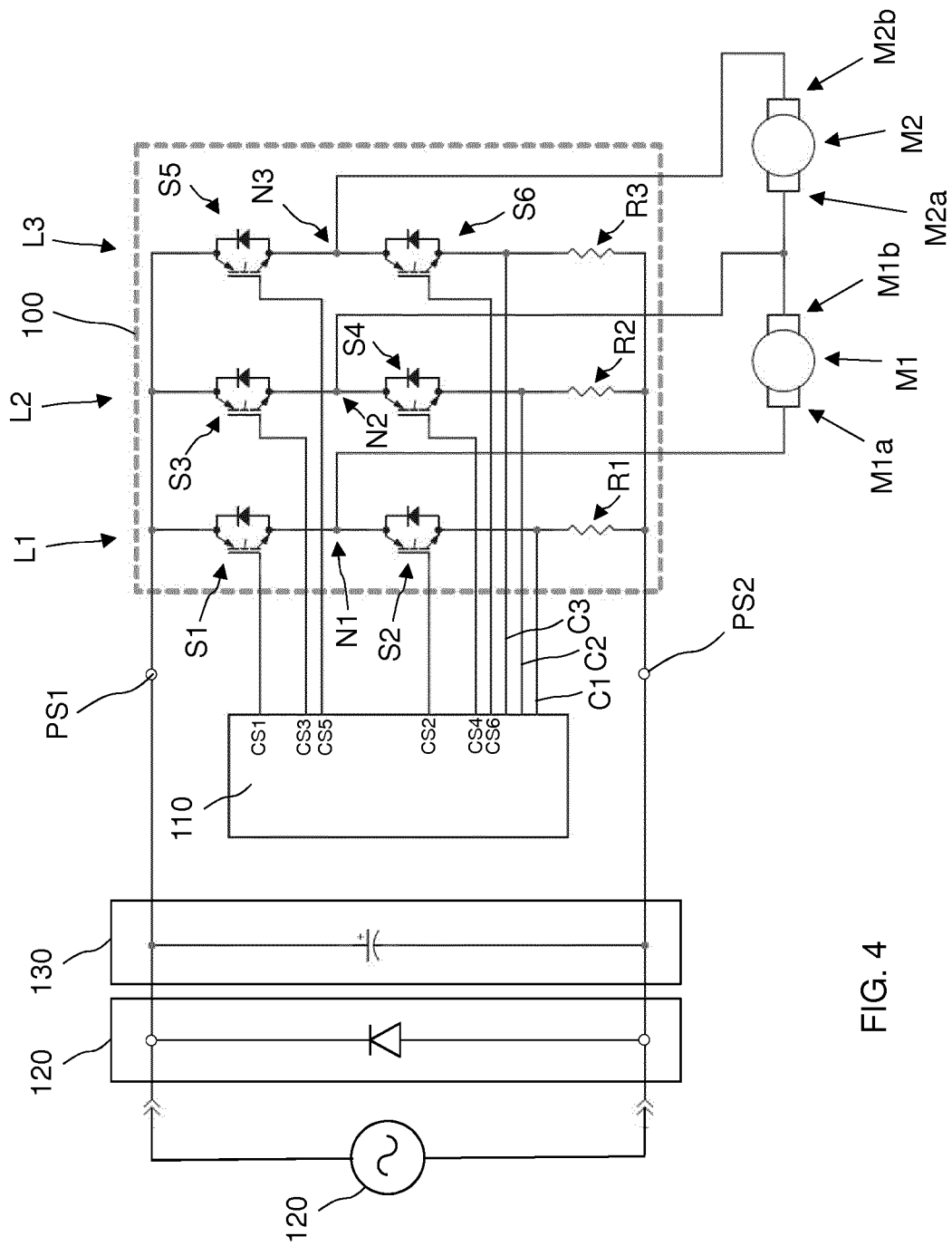
FIG. 4 shows an embodiment of an electric drive unit according to the invention for operating two hydraulic pumps of the washing machine of FIG. 2.

According to an advantageous aspect of the invention, the laundry washing machine 1 preferably comprises an electric drive unit 100, as illustrated with dashed line in FIG. 4, for driving two electric motors M1 and M2 which equips the laundry washing machine 1. Electric motors M1 and M2 preferably activate respective pumps P1, P2.

Referring to the preferred embodiment of FIG. 2, the electric drive unit 100 is indicated as part of the control unit 11 and preferably controls the pumps 21, 31, in particular the respective motors, of the recirculation circuits 20, 30.

In other words, the pumps P1, P2 illustrated in FIG. 4 correspond to pumps 21, 31 of the recirculation circuits 20, 30.

In different embodiments, the electric drive unit 100 may not be part of the control unit 11 and realized separately, in case electrically connected to the control unit 11.

Furthermore, the laundry washing machine preferably comprises further electric drive unit for driving other couple of motors which equips the same. For example, referring to the embodiment shown in FIG. 2, a further electric drive unit may be used to drive the pump 26 of the water outlet circuit 25 and the pump 80 of the water softening device 70.

The electric drive unit 100 is preferably connected to a first power supply line PS1 and a second power supply line PS2.

In the preferred embodiment here illustrated and described, said power supply lines PS1, PS2 are preferably connected to an AC voltage system 120 of e.g. 230 VAC, for example the domestic mains, via a rectifier unit 120 and a DC voltage intermediate circuit 130, preferably a capacitor.

According to an advantageous aspect of the invention, the electric drive unit 100 preferably comprises three legs L1, L2 and L3.

The first leg L1 preferably comprises a first switch S1 and a second switch S2 connected in series between the first power supply line PS1 and the second power supply line PS2.

The second leg L2 preferably comprises a third switch S3 and a fourth switch S4 connected in series between the first power supply line PS1 and the second power supply line PS2.

The third leg L3 preferably comprises a fifth switch S5 and a sixth switch S6 connected in series between the first power supply line PS1 and the second power supply line PS2.

Switches S1-S6 preferably comprise solid-state switches, preferably MOSFETs.

MOSFETs illustrated herein are provided with respective free-wheel diodes.

Nevertheless, in further preferred embodiments different solid-state switches may be utilized, for example IGBTs preferably provided with respective free-wheel diodes.

In a preferred embodiment, the electric drive unit may be realized with six separated switches.

In a further preferred embodiment, the electric drive unit may be realized with one or more power modules which preferably comprises two or more integrated switches, even one power module comprising six switches.

According to an advantageous aspect of the invention, the first electrical terminal M1a of the first electric motor M1 is preferably connected to a node N1 between the first switch S1 and the second switch S2 of the first leg L1 and the second electrical terminal M1b of the first electric motor M1 is preferably connected to a node N2 between the third switch S3 and the fourth switch S4 of the second leg L2.

Furthermore, the first electrical terminal M2a of the second electric motor M2 is preferably connected to the node N2 between the third switch S3 and the fourth switch S4 of the second leg L2 and the second electrical terminal M2b of the second electric motor M2 is preferably connected to a node N3 between the fifth switch S5 and the sixth switch S6 of the third leg L3.

A control unit 110 is preferably connected to the drive unit 100 to operate the electric motors M1, M2. Preferably, the control unit 110 comprises six command signals CS1-CS6 for the six switches S1-S6 so that they can be selectively turned on and off.

Depending on the motor M1, M2, and hence the pump P1, P2, which needs to be activated during the washing cycle, the control unit 110 opportunely drives the switches S1-S6 of the drive unit 100.

Figure 4A:
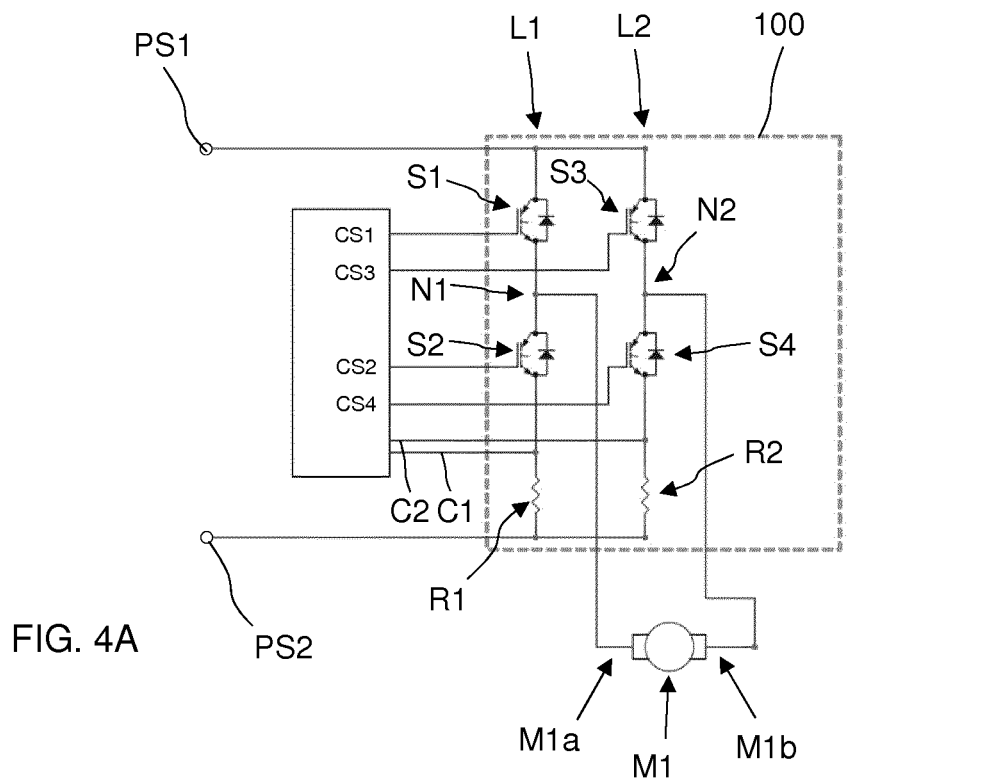
FIG. 4A shows the electric drive unit of FIG. 4 in a first operative condition.

In particular, when the motor M1 needs to be activated, the control unit 110 drives the four switches S1-S4 through the respective command signals CS1-CS4, while the fifth and sixth switches S5, S6 are maintained off. The motor M1 is therefore preferably controlled in a conventional full H-bridge configuration, as illustrated in FIG. 4A.

Figure 4B:
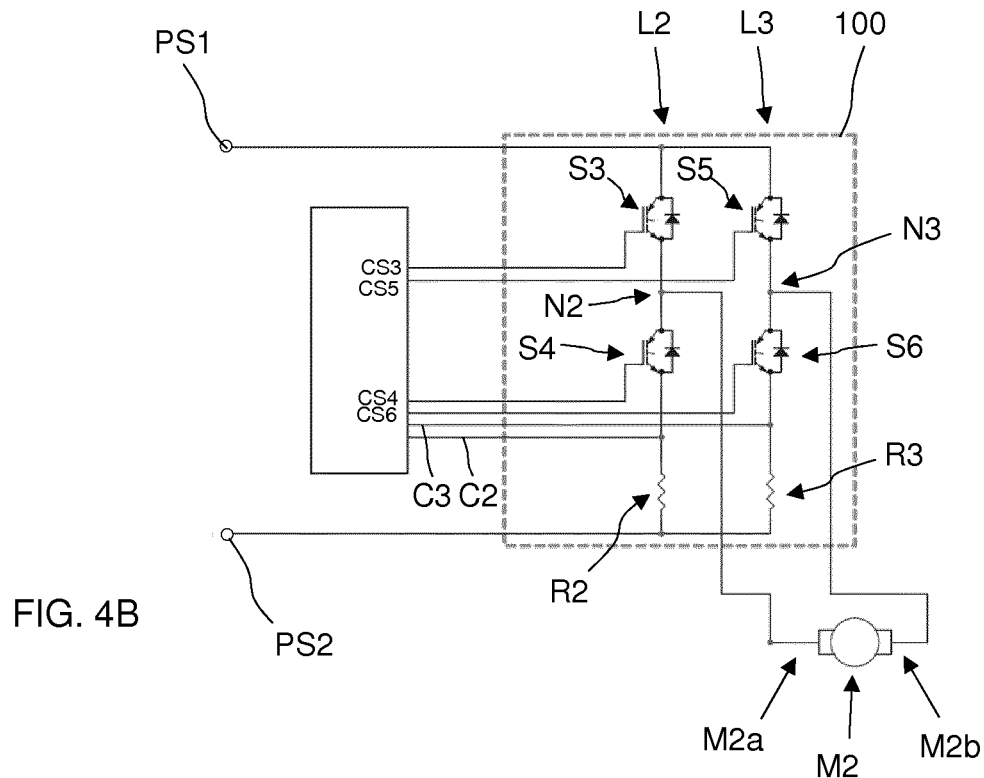
FIG. 4B shows the electric drive unit of FIG. 4 in a second operative condition.

Analogously, when the motor M2 needs to be activated, the control unit 110 drives the four switches S3-S6 through the respective command signals CS3-CS6, while the first and second switches S1, S2 are maintained off. The motor M2 is therefore preferably controlled in a conventional full H-bridge configuration, as illustrated in FIG. 4B.

Standard operation of the motors M1, M2 can therefore be performed via the respective full H-bridge, preferably with a PWM technique (Pulse Width Modulation technique). Advantageously, one or both the motors M1, M2 can be driven at variable speeds.

Preferably, the drive unit 100 also comprises current sensors lines C1, C2, C3 for the control unit 110. The drive unit 100 preferably comprises three resistors R1, R2, R3 so that voltage detected from lines C1, C2, C3 gives indication of currents on the three legs L1, L2, L3.

Figure 5:
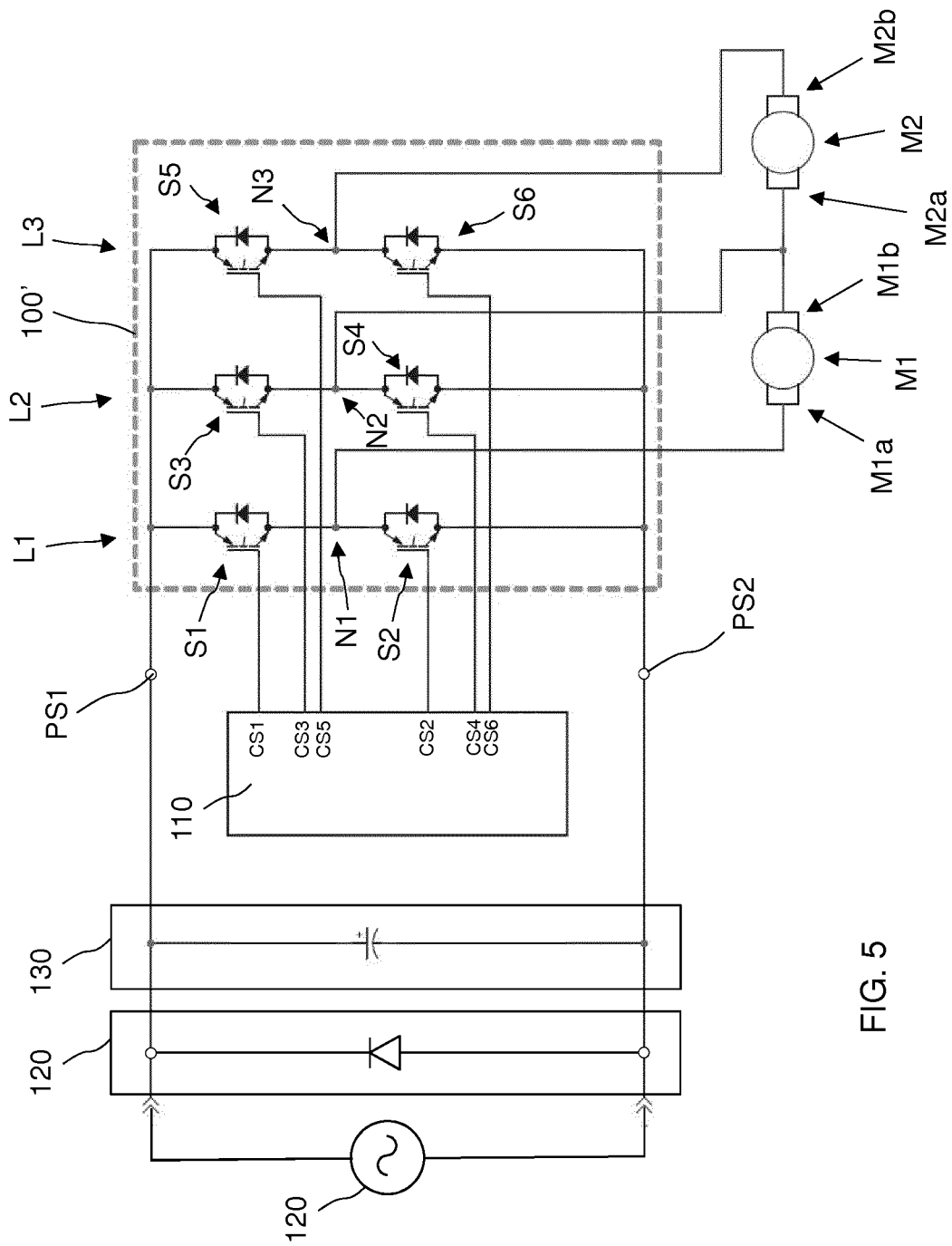
FIG. 5 shows an electric drive unit according to a further preferred embodiment of the present invention.

In different preferred embodiments, the resistor R1, R2, R3 may be placed in other point along the legs L1, L2, L3. In further preferred embodiments, the resistor R1, R2, R3 may be omitted, as illustrated in the preferred embodiment of the drive unit 100' in FIG. 5.

In this case, currents on the three legs L1, L2, L3 may be detected in different ways, according to known techniques in the art. For example, currents may be detected through respective Hall sensors.

Advantageously, the drive unit 100, 100' according to the invention allows the driving of two single phase electric motors M1, M2 by means of a simpler circuit than known systems. In particular, the drive unit 100, 100' uses only six switches S1-S6.

Manufacturing time and costs of the drive unit are therefore advantageously reduced compared to known system.

Furthermore, reduced complexity increases reliability of the drive unit compared to known systems.

It has thus been shown that the present invention allows all the set objects to be achieved. In particular, it makes it possible to provide an electric drive unit for electric motor with reduced complexity compared to known techniques.

While the present invention has been described with reference to the particular embodiments shown in the figures, it should be noted that the present invention is not limited to the specific embodiments illustrated and described herein; on the contrary, further variants of the embodiments described herein fall within the scope of the present invention, which is defined in the claims.

The invention claimed is:

1. A washing machine having a first single phase electric motor, a second single phase electric motor and an electric drive unit configured to operate the electric motors, the electric drive unit being connected to a first power supply line and a second power supply line, wherein the electric drive unit comprises:
    a first leg comprising a first switch and a second switch connected in series between the first power supply line and the second power supply line;
    a second leg comprising a third switch and a fourth switch connected in series between the first power supply line and the second power supply line;
    a third leg comprising a fifth switch and a sixth switch connected in series between the first power supply line and the second power supply line;
    wherein a first electrical terminal of the first electric motor is connected to the first leg and a second electrical terminal of the first electric motor is connected to the second leg and wherein a first electrical terminal of the second electric motor is connected to the second leg and a second electrical terminal of the second electric motor is connected to the third leg.

2. The washing machine according to claim 1, wherein the first electrical terminal of the first electric motor is connected to a node between the first switch and the second switch of the first leg and the second electrical terminal of the first electric motor is connected to a node between the third switch and the fourth switch of the second leg and wherein the first electrical terminal of the second electric motor is connected to a node between the third switch and the fourth switch of the second leg and the second electrical terminal of the second electric motor is connected to a node between the fifth switch and the sixth switch of the third leg.

3. The washing machine according to claim 1, wherein the switches comprise solid-state switches.

4. The washing machine according to claim 3, wherein one or more of the switches comprises a free-wheel diode.

5. The washing machine according to claim 3, wherein the switches comprise MOSFETs or IGBTs.

6. The washing machine according to claim 1, wherein the first leg comprises a first resistor, wherein the first resistor is connected between the second switch and the second power supply line.

7. The washing machine according to claim 6, wherein the second leg comprises a second resistor, wherein the second resistor is connected between the fourth switch and the second power supply line.

8. The washing machine according to claim 7, wherein the third leg comprises a third resistor, wherein the third resistor is connected between the sixth switch and the second power supply line.

9. The washing machine according to claim 1, further comprising a control unit configured to operate each one of the switches.

10. The washing machine according to claim 9, wherein the control unit is configured to operate the first to fourth switches to activate the first electric motor.

11. The washing machine according to claim 10, wherein the control unit is configured to operate the first to fourth switches according to a PWM technique.

12. The washing machine according to claim 10, wherein the control unit is configured to operate the third to sixth switches to activate the second electric motor.

13. The washing machine according to claim 12, wherein the control unit is configured to operate the third to sixth switches according to a PWM technique.

14. The washing machine according to claim 1, wherein at least one of the first electric motor and the second electric motor comprises a synchronous electric motor.

15. The washing machine according to claim 1, wherein at least one of the first electric motor and the second electric motor is comprises an electric motor operatively connected to a pump provided in the washing machine.

16. The washing machine according to claim 1, wherein the first power supply line and the second power supply line are connected to a AC voltage system via a rectifier unit and a DC voltage intermediate circuit.

* * * * *